United States Patent [19]

Ryan

[11] 4,095,639

[45] Jun. 20, 1978

[54] INSULATING SCREEN

[76] Inventor: Declan Francis Ryan, 15 Mardyke St., Athlone, County Westmeath, Ireland

[21] Appl. No.: 705,989

[22] Filed: Jul. 16, 1976

[30] Foreign Application Priority Data

Jul. 18, 1975 Ireland ............................ 1612/75

[51] Int. Cl.² .......................... E06B 3/94; A47H 5/00
[52] U.S. Cl. ............................................. 160/84 R
[58] Field of Search ............. 160/84 R, 84 H, 231 R, 160/231 A

[56] References Cited

U.S. PATENT DOCUMENTS

| | | | |
|---|---|---|---|
| 2,829,081 | 4/1958 | Sweem | 160/231 |
| 2,903,055 | 9/1959 | Merrill | 160/84 H |
| 3,242,972 | 3/1966 | Truesdale | 160/84 R |
| 3,481,073 | 12/1969 | Yoshida et al. | 160/84 R |
| 3,599,702 | 8/1971 | Bedard | 160/84 R |
| 3,628,626 | 12/1971 | Merrill | 160/84 R |

*Primary Examiner*—Peter M. Caun
*Attorney, Agent, or Firm*—Sughrue, Rothwell, Mion, Zinn and Macpeak

[57] ABSTRACT

A thermally insulating screen is provided for glasshouses, large expanses of window, and the like. The screen has one fixed margin and one free margin and can be deployed and retracted substantially in its own plane. It is fabricated from plastics film and comprises a close array of parallel tubular air chambers arranged perpendicular to the direction of deployment and retraction, each chamber folding flat into a plane perpendicular to the screen plane when the latter is retracted. The open ends of the chambers are guarded by flaps which permit the entry and release of air during expansion and contraction of the chambers but discourage convection. When mounted for use in a horizontal attitude the screen depends from gliders or pulleys on a fixed track.

6 Claims, 13 Drawing Figures

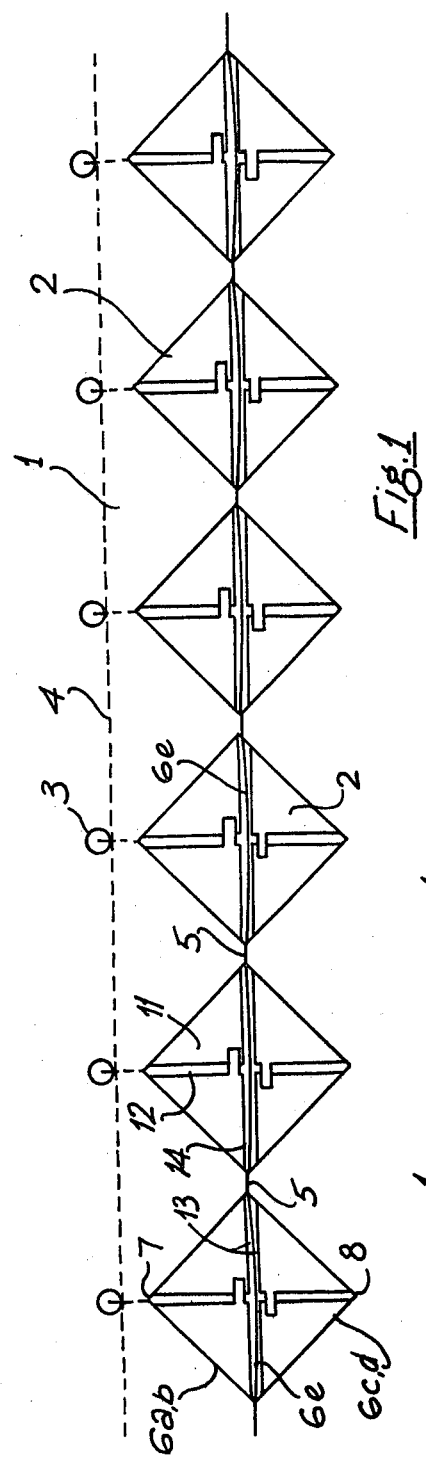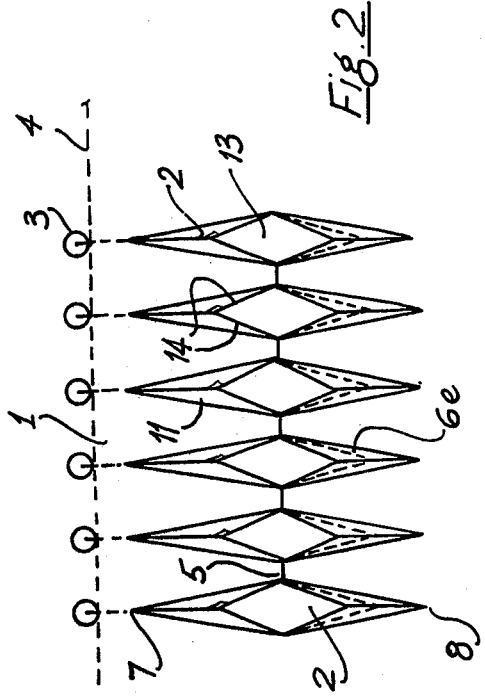

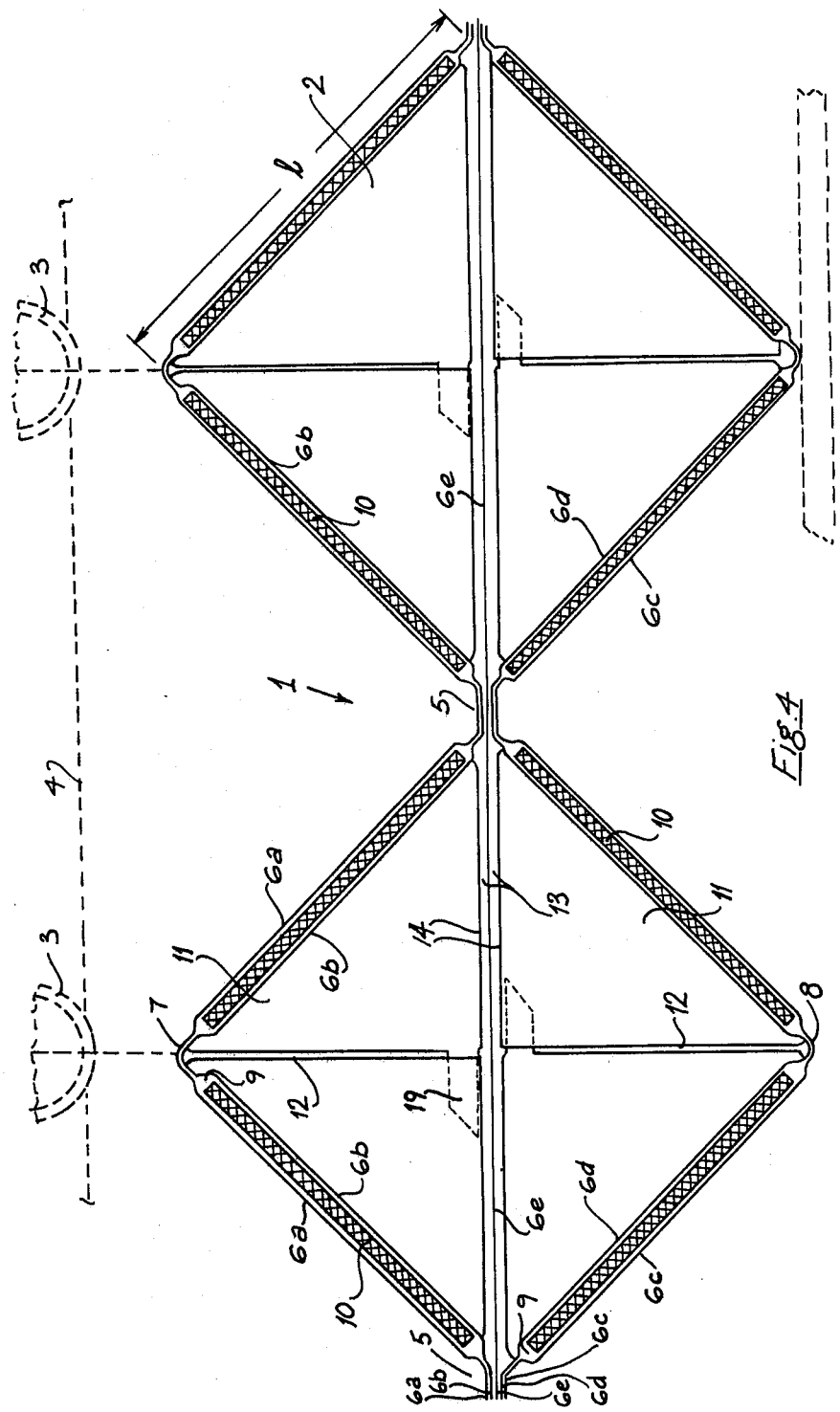

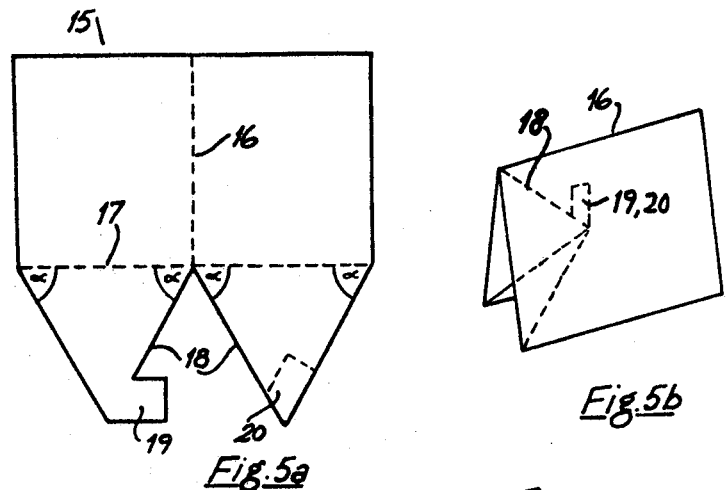
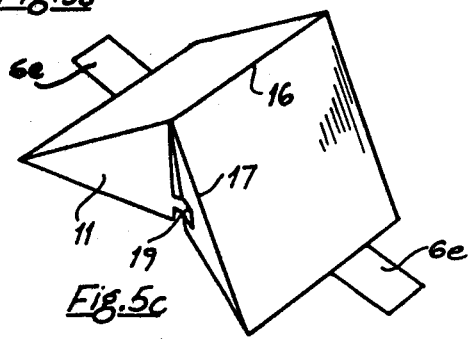
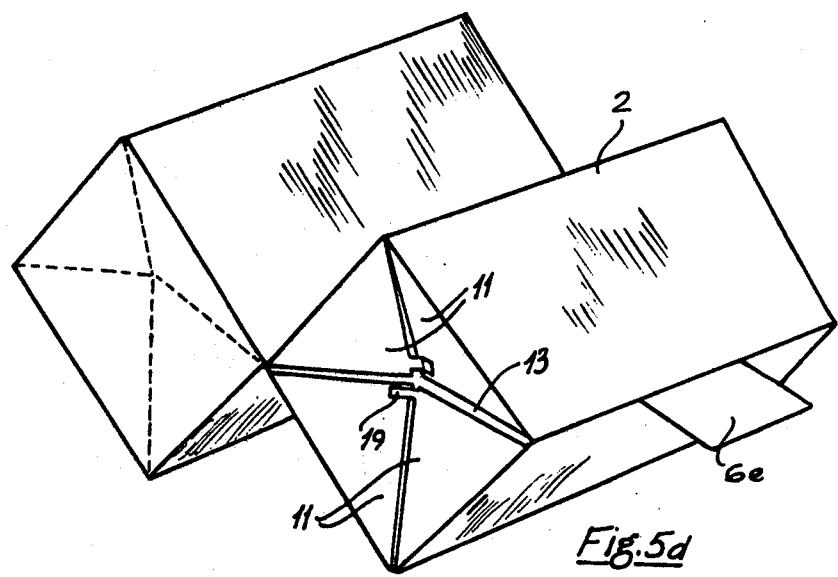

INSULATING SCREEN

This invention relates to an insulating screen. In particular it relates to a thermally insulating screen for use in buildings, such as glasshouses, which contain large walls or roof areas of low thermal insulating capacity.

It is sometimes desirable to provide temporary thermal insulating in a building of the kind described. This can be necessary either to exclude heat during warm weather or, what is more usual in temperate climates, to conserve heat during cold periods. In particular, it is desirable to conserve heat in glasshouses during the hours of darkness. It is well known that heat conservation can be achieved by providing a screen of entrapped or immobile air in or adjacent the building surfaces of low insulating capacity, such as glass walls and roofs. One known method of doing this is to provide double glazing, but this is an expensive expedient. It is also permanent, and thus does not really tackle the problem of providing temporary insulation.

It is an object of this invention to provide a thermally insulating screen which can be deployed in a short time and likewise retracted without undue delay. It is another object of the invention to provide a thermally insulating wall or window curtain or a suspended ceiling, particularly the latter, deployment and retraction of which can be effected semiautomatically with little or no labour or supervision.

The invention accordingly provides a thermally insulating screen which can be deployed and withdrawn by expansion and contraction in its own plane, comprising at least one integral layer of similar inflatable tubular air chambers in parallel formation, each chamber being adapted to fold flat into a plane perpendicular to the layer, means for erecting and expanding the chambers to expand the layer in its own plane, and means for collapsing and contracting the chambers into their flat folded state to contract the layer in its own plane.

Although the thermally insulated screen of the invention may be suspended beside a window and used as a curtain, it is preferably adapted for use as a suspended ceiling, with the layer of air chambers being suspended by horizontally displaceable hanger members cooperating with a set of parallel support tracks fixed in the building. The tracks are usually horizontally disposed. The hanger members may be pulleys or low-friction gliders, and the support tracks may comprise rigid rails or wires fixed in the building under tension. The screen is normally attached, more or less fixedly, to a wall or roof of the building along the line of one of the air chambers. Preferably this attachment is along one of the outer or terminal chambers, whereby expansion and deployment can take place in one direction only.

It is possible to provide a screen in accordance with the invention wherein the air chambers intercommunicate and are connected to a reversible air pumping apparatus whereby positive air entry and exit causes erection and collapse of the air chambers, thus effecting deployment and withdrawal of the screen.

However, for reasons of economy and simplicity in manufacture, it is preferred that erection and collapse of the air chambers be effected by mechanical displacement of a free edge of the screen, the opposite edge being fixed to a structure such as a wall or ceiling. Each air chamber then has at least one opening to atmosphere, whereby air entry and exit of the air chambers is an automatic consequence of erection and collapse thereof respectively.

Preferably the opening is at the end of the air chamber (both ends may be open), and is guarded by at least one flap, which flap is adapted to permit the intentional air entry and exit, above referred to, of the air chamber, but also to protect the confined air in the expanded chamber against casual losses and substantially limit convection. A suitable flap should fold inwardly into the end of the air chamber upon collapse of the air chamber into its flat folded state.

The cross-section of each air chamber may be triangular; but is rhombic, the attachment of each air chamber to its next neighbour being along the edge thereof which appears in cross-section as an apex of the rhombus, whereby each rhomboid air chamber has one diagonal plane that lies parallel to the plane of the screen.

If the air chambers should spread out too flat upon deployment of the screen, it would be difficult to force them back into a collapsed state on withdrawal thereof, bearing in mind that each chamber is to fold flat into a plane perpendicular to the layer of chambers. It is therefore desirable to incorporate means such as an inextensible tie member running from end to end of the screen in the direction of deployment, attached to each air chamber so as to limit and define thereby the maximum extension of the deployed screen. The tie member may comprise a sheet or membrane threading the air chambers through their lines of mutual attachment. This arrangement has the additional advantage that the sheet or membrane, if made sufficiently wide, can effectively divide each air chamber into two smaller chambers, increasing the degree of thermal insulation provided by the screen. In rhomboid air chambers the division of each is into a pair of triangular prismatic sub-chambers having a common base in their triangular cross-sections.

A more elaborate embodiment of the invention, for use where greater heat insulation is desired, comprises a plurality of layers of air chambers, the layers being bonded one to another.

The invented screen can be fabricated from at least two sheets of flexible sheet material, preferably polymeric film such as polyethylene, which are connected, as by adhesion or welding, along a plurality of parallel joins to form the air chambers between said sheets. The inextensible tie member is conveniently a further or third sheet of the same material, shorter than the other two, and bonded between them along the same set of joins. In a further preferred embodiment the screen is made from two pairs of sheets, viz., one pair to either side of each air chamber. This provides the air chambers with hollow walls, the cavities of which can serve to accommodate slips or sheets of thermal and/or light insulating material. For example, substantially rigid leaves of a solid polymeric foam such as polystyrene foam can be inserted therein, and will additionally help in stiffening and straightening the walls of the air chambers to give them the desired rhombic or triangular cross-section as the case may be.

The invention will be appreciated in greater detail from the following description of a particular preferred embodiment thereof, given by way of example only, with reference to the accompanying drawings, in which:

FIG. 1 is a side elevation of a portion of a thermally insulating screen intended for use as a suspended ceiling in a glasshouse, shown in the extended or deployed state;

FIG. 2 is a side elevation of the screen portion of FIG. 1 shown in the contracted or withdrawn state;

FIG. 4 is an enlarged sectional side elevation of a smaller portion of the same screen, taken from FIG. 3 along the line IV—IV and viewed in the direction of the arrows;

FIG. 5 (a, b, c, and d) shows successive stages in the construction and attachment of the end flaps for the air chambers of the screen of FIGS. 1-4;

Figure 3:
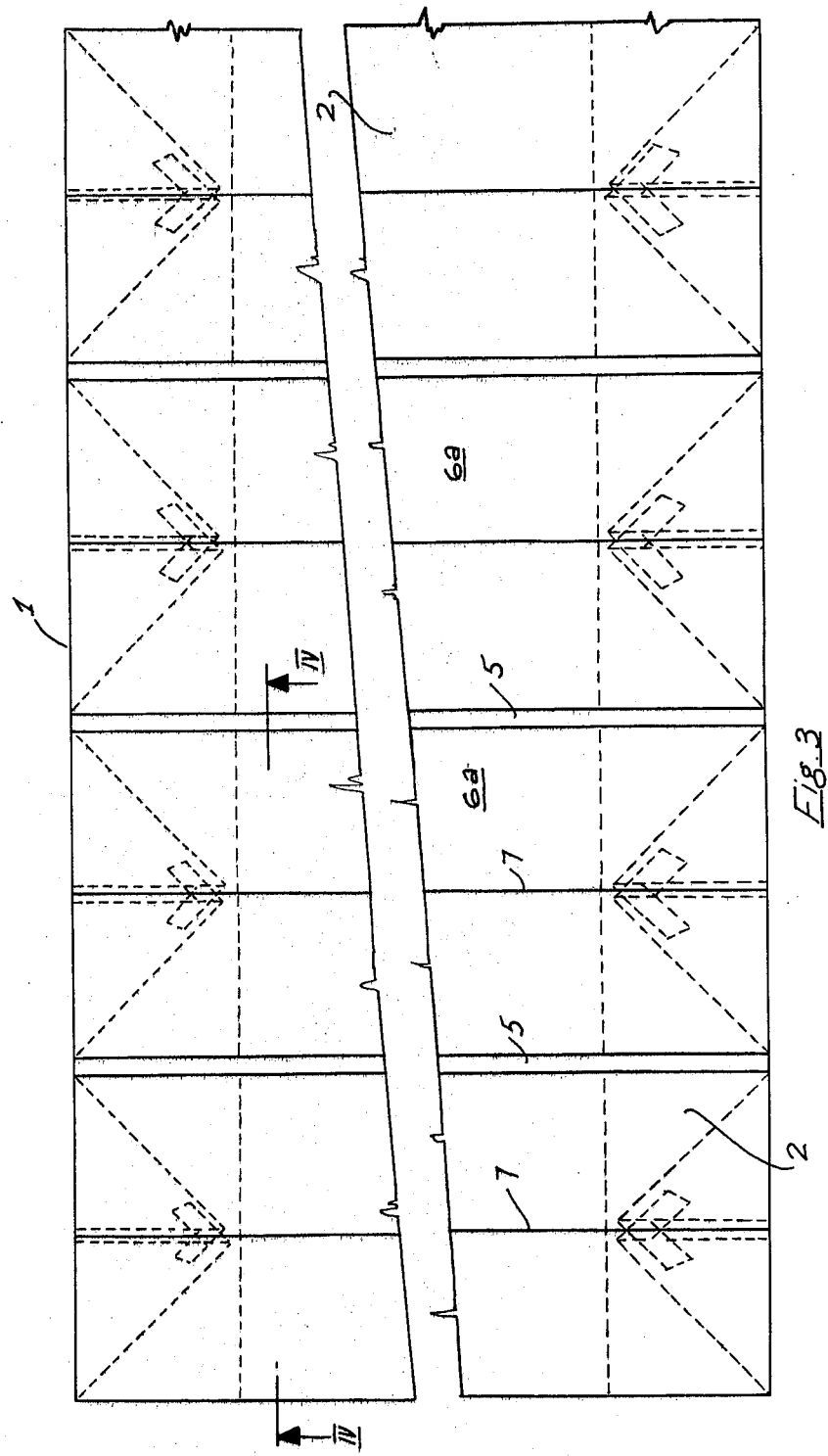
FIG. 3 is a fragmentary plan view taken from FIG. 1.

Referring now to the drawings, and in particular to FIGS. 1-4, a thermally insulating screen 1 comprises an integral array or layer of similar expandable tubular air chambers 2 of rhombic cross-section, suspended from small pulleys 3 which run on wires 4 mounted in tension beneath the ceiling of a glasshouse. The chambers 2 are fabricated from sheets of polyethylene heat-sealed together along parallel pathways 5. Five such sheets in all are used, an upper pair 6a, 6b, a lower pair 6c, 6d, and a tie sheet 6e. The upper and lower pairs are bonded together additionally along pathways 7, 8 respectively, to assist in producing a clean rhombic cross-section. The sheet pairs 6a, 6b, and 6c, 6d form hollows walls, in the cavities 9 of which lie sandwiched thin slabs 10 of foam polystyrene for stiffness and improved insulation. The dimension 1 shown in FIG. 4 is about 100 mm.

Each end of each air chamber 2 terminates in two flaps 11 each having a slot 12. The slot 12, together with a gap 13 between the unattached edges 14 of the flaps 11, permits free air movement into and out of the air chamber 2 during erection and folding collapse thereof, leading to automatic air entry and exit of each air chamber as the screen is deployed and retracted respectively.

In use the screen is deployed by displacing pulleys 3 along the wires 4 in the direction of extension of the screen. This is accomplished by manual means, such as by the use of cords and further, fixed pulleys, or can be done mechanically. Motorised crawler pulleys, for example, can be provided on the leading edge of the screen, and the simple wires 4 replaced by suitable tracks adapted for accommodating the crawler pulleys.

Referring now to FIG. 5 (a, b, c and d), a flap 11, as previously described, is cut from polyethylene film to a shape 15, and folded along the lines 16 and 17. The angles $\alpha$ are all equal and greater than 45°. In this case they are 60° (FIG. 5a).

The edges 18 are approximated and a tab 19 sealed over the position 20 to yield the structure shown in FIG. 5b. The flap 11 accordingly folds inwardly when the angle of the fold 16 is narrowed. The flap never projects forwardly of the fold 17 and the maximum value of the angle of the fold 16 is determined by the sealed-in inextensible tie member 6e. Two flaps 11, constructed as described, are sealed into the open end of an air chamber 2 (FIG. 5d). It will be apparent that the gap 13 is at its narrowest when the air chamber 2 is erect, and is wider during expansion and contraction, thus facilitating the movement of the air.

Figure 6:
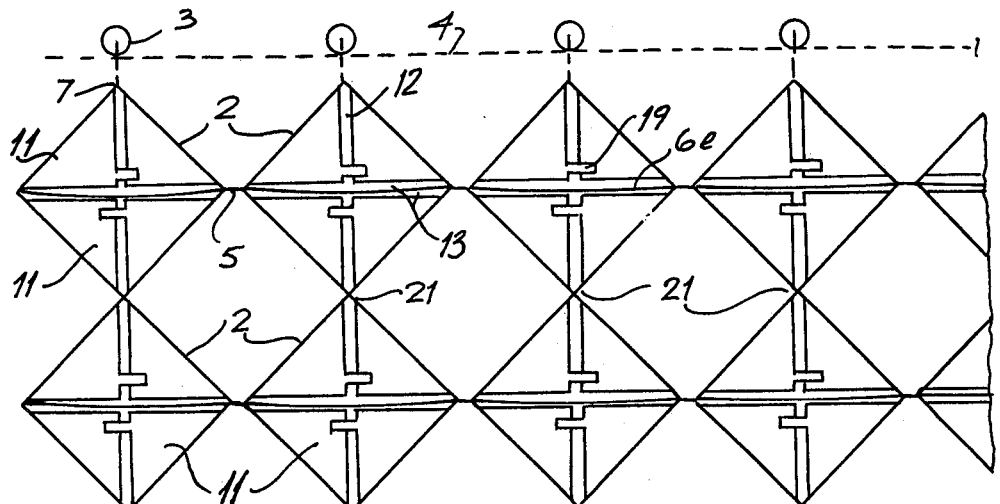
FIG. 6 is a side elevation of a portion of a thermally insulating screen comprising two layers of air chambers, the individual layers being similar to those of the screen of FIGS. 1-4.

FIG. 6 bears reference numerals as used in FIGS. 1-5 and is thought to be self-explanatory, in conjunction with its introduction above, apart from the observation that the two layers of rhomboidal air chambers 2 are attached together by heat sealing along adjacent lower and upper edges in the region 21.

Figure 7A:
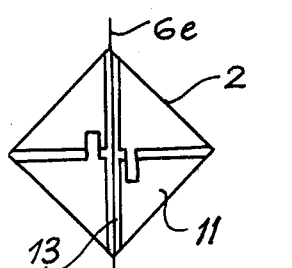
FIG. 7 (a and b) is a side elevation of a portion of a screen similar to that of FIGS. 1 and 2 intended for use as a wall screen in a glasshouse, in the expanded (a) and retracted (b) states.
Figure 7B:
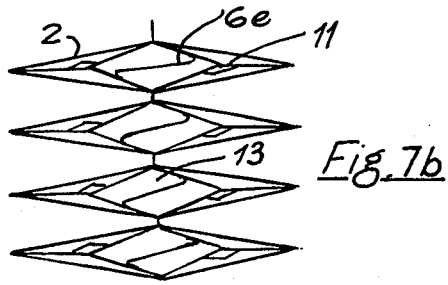

FIG. 7 (a and b) will be immediately seen to represent the screen of FIGS. 1-4 deployed and retracted respectively, in a vertical orientation. However, the pulleys 3 and wires 4 of those figures are absent. The screen is suspended by attachment of its inextensible tie member 6e, and deploys under gravity. However, a special mechanical hoisting arrangement (not shown) is necessary for retraction. Alternatively, this screen can be retracted under gravity to a lower position, and mechanically hoisted for deployment.

Figure 8A:
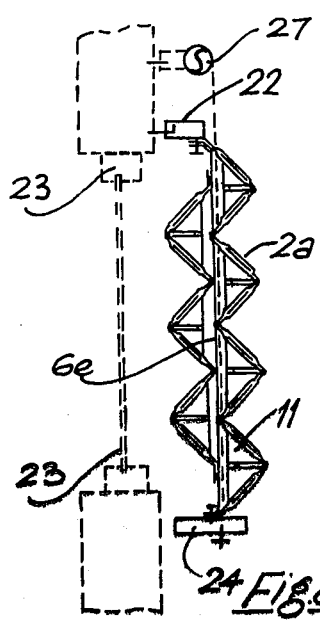
FIG. 8 (a and b) is a side (a) and front (b) elevation of a modified thermally insulating screen designed for use in screening a window in a building.
Figure 8B:
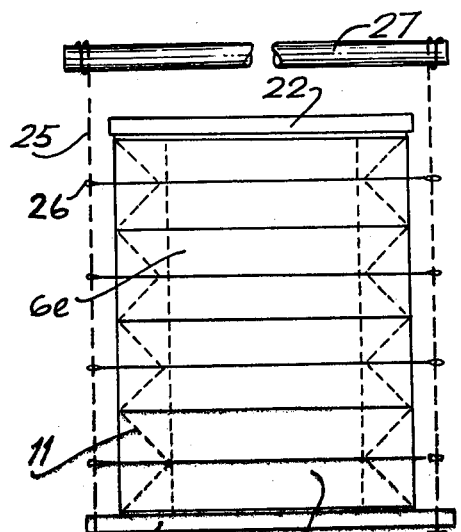

FIG. 8 (a and b) shows a somewhat miniaturised embodiment of the screen of the invention. Separate series of air chambers 2a of triangular cross-section are attached on either side of the inextensible tie member 6e. The bases of the triangles are staggered, a measure which causes the screen when folded up, to be less bulky than in the rhomboid versions of the previous embodiments. The screen is fixed to a bracket 22 above a window reveal 23, and is provided with a solid end piece 24 of suitable weight to assist deployment. Supporting cords 25 pass through guides 26 attached to the tie member 6e, and can be wound up on a roller 27 which may be of holland blind type. End flaps 11 are provided as previously described.

It is desirable that a cover (not shown) should be fitted under which the screen, when retracted, is protected from direct sunlight, since some plastics sheet materials, otherwise suitable for use in this invention, deteriorate physically when exposed to strong sunlight for long periods.

What I claim is:

1. A thermally insulating screen which can be deployed and withdrawn by extension and retraction in its own plane, comprising at least one integral layer of similar tubular air chambers of flexible plastics film sheets in parallel formation, without a rigid framework and defining screen sidewalls, and an inextensible tie member fixed to said at least one layer to limit the extension of the screen chambers, each chamber being adapted to fold flat into a plane perpendicular to the layer on retraction of the screen, each chamber moreover having at least one open end and being provided at said open end with at least one guard flap constituting an extension of one of said film sheet sidewalls and being folded substantially perpendicular to said sidewall during chamber extension to substantially close off said at least one open end to permit the passage of air in quantity through said open end during expansion and contraction of the chamber only during erection and retraction of the screen, but which renders the interior or each chamber in the deployed screen substantially unventilated, upon erection to substantially restrict convection air flow through said at least one open end of said chamber.

2. A screen according to claim 1, wherein the inextensible tie member threads the air chambers from a leading edge to an opposite edge of the screen, and said tie member is affixed to a plurality of said chambers for limiting the maximum extension of all said chambers in the plane of deployment of the screen.

3. A screen according to claim 1, wherein each air chamber is of substantially triangular cross-section, and the tie member is of extended sheet form comprising one side of each air chamber.

4. A screen according to claim 1 wherein each air chamber is of substantially rhombic cross-section and is attached to each adjacent air chamber along an edge corresponding to a rhombic apex, whereby each air chamber has one rhombic diagonal plane that lies parallel to the plane of the deployed screen, the maximum dimension of the chamber in said plane being limited by the tie member.

5. A screen according to claim 1 wherein each guard flap is adapted to retract from a chamber-occluding orientation and to fold flat in step with its associated air chamber during screen retraction.

6. A screen according to claim 1 comprising a plurality of layers of air chambers, the layers being bonded one to another.